United States Patent [19]

Hosogoe et al.

[11] Patent Number: 4,562,314
[45] Date of Patent: Dec. 31, 1985

[54] X-Y POSITIONS INPUT DEVICE FOR DISPLAY SYSTEM

[75] Inventors: Junichi Hosogoe; Motoyuki Suzuki; Yuichi Ida, all of Miyagi, Japan

[73] Assignee: Alps Electric Co., Ltd., Japan

[21] Appl. No.: 587,409

[22] Filed: Mar. 8, 1984

[30] Foreign Application Priority Data

Mar. 9, 1983 [JP] Japan .............................. 58-32769[U]
Mar. 9, 1983 [JP] Japan .............................. 58-32770[U]

[51] Int. Cl.$^4$ ............................................. H01H 9/00
[52] U.S. Cl. .............................. 200/5 R; 74/471 XY; 340/710
[58] Field of Search .................... 200/5 R, 6 A, 11 R, 200/11 A, 11 B, 11 C, 11 D, 11 DA, 11 E, 11 EA, 11 G, 11 H, 11 J, 11 K, 11 TC, 11 TW; 340/710; 74/198, 471 XY

[56] References Cited

U.S. PATENT DOCUMENTS 3,541,541 11/1970 Engelbart ............................ 340/710

FOREIGN PATENT DOCUMENTS 1916348 10/1970 Fed. Rep. of Germany .

*Primary Examiner*—A. D. Pellinen
*Assistant Examiner*—Morris Ginsburg
*Attorney, Agent, or Firm*—Guy W. Shoup

[57] ABSTRACT

An X-Y input device comprises a rotatable ball, a first driven roller held in contact with the rotatable ball and rotatable in response to rotation of the rotatable ball, a second driven roller held in contact with the rotatable ball and rotatable in response to rotation of the rotatable ball, the second driven roller having an axis of rotation extending substantially perpendicularly to that of the first driven roller, first rotation detector means for detecting an amount of rotation of the first driven roller, and second rotation detector means for detecting an amount of rotation of the second driven roller. Each of the rotation detector means comprises a pattern base plate including a central pattern and a peripheral pattern concentric with the central pattern, a slider having a first contact end held in slidable contact with the central pattern and a second contact end held in slidable contact with the peripheral pattern, and a slider support supporting the slider and connected to each of the driven rollers for rotation. The first contact end of the slider is held in contact with the central pattern at a point aligned with a central axis of rotation of the driven roller, or the central pattern of the pattern base plate has a center aligned with a central axis of rotation of the driven roller.

4 Claims, 58 Drawing Figures

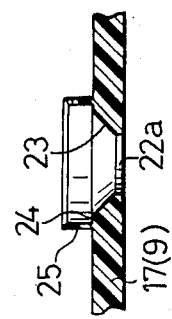
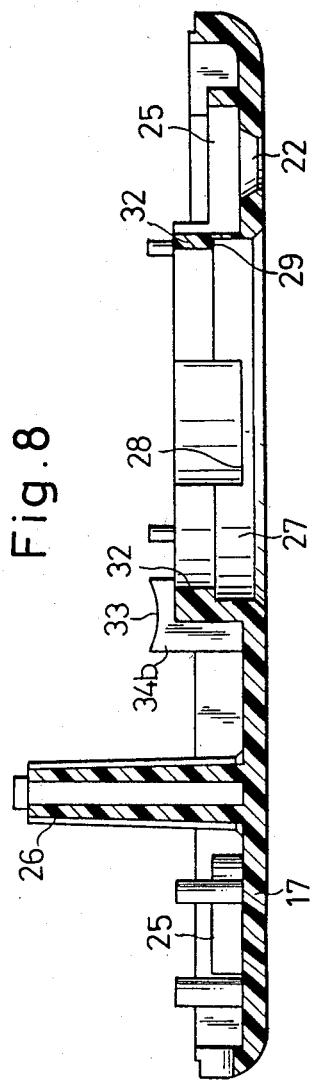
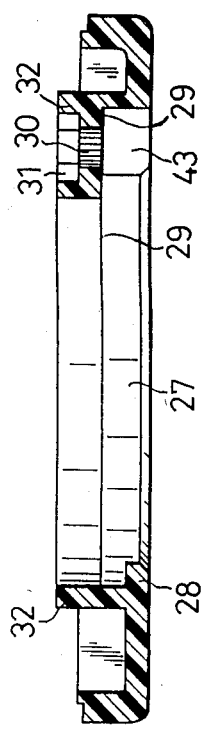

X-Y POSITIONS INPUT DEVICE FOR DISPLAY SYSTEM

BACKGROUND OF THE INVENTION

The present invention relates to an X-Y input device, and more particularly to an X-Y input device suitable for use as a graphics input device associated with a graphic display apparatus.

Graphic display apparatus are basically composed of a display screen, a display controller, a data channel, and an input device which may be of various types. One known input device is a "joystick" having a lever supported by a gimbal mechanism and tiltable by the operator in any direction. A control device detects the direction and angle of tilt of the lever and generates voltages or digital signals indicative of coordinate values in X and Y directions. This type of input device is disadvantageous however in that the range of angular movement of the lever is limited and data signals entered by the operator are relatively unstable.

In an effort to eliminate the above shortcomings, there has in recent years been developed an input device device called a "mouse". One type of the mouse has a rotatable member such as a steel ball (hereinafter referred to as a "ball"), a first driven roller held in contact with the ball and rotatable in response to rotation thereof, and a second driven roller held in contact with the ball and rotatable in response to rotation thereof. The first and second rollers have their axes of rotation extending substantially perpendicularly to each other. The mouse also includes first and second angle detector means composed of variable resistors and encoders for separately detecting angles of rotation of the first and second driven rollers. The ball, first and second driven rollers, and first and second angle detector means are all housed in a casing.

The casing has an opening defined in its bottom with the ball partly projecting through the opening. In use, the casing is held by the operator to place the ball against a given base or surface. By moving the case to cause the ball to roll on the surface in any desired two-dimensional directions, the first and second driven rollers are rotated about their own axes in directions and through angles dependent on the rolling movement of the ball. The directions and angles of rotation of the driven rollers are converted by the first and second angle detector means into voltages or digital signals representative of coordinate values in X and Y directions. The generated signals are then entered into a display apparatus.

SUMMARY OF THE INVENTION

It is an object of the present invention to provide an X-Y input device of the type known as a mouse, which is highly reliable in construction and operation.

According to the present invention, there is provided an X-Y input device comprising a rotatable ball, a first driven roller held in contact with the rotatable ball and rotatable in response to rotation of the rotatable ball, a second driven roller held in contact with the rotatable ball and rotatable in response to rotation of the rotatable ball, the second driven roller having an axis of rotation extending substantially perpendicularly to that of the first driven roller, first rotation detector means for detecting an amount of rotation of the first driven roller, and second rotation detector means for detecting an amount of rotation of the second driven roller, each of the rotation detector means comprising a pattern base plate including a central pattern and a peripheral pattern concentric with the central pattern, a slider having a first contact end held in slidable contact with the central pattern and a second contact end held in slidable contact with the peripheral pattern, and a slider support supporting the slider and connected to each of the driven rollers for rotation therewith, the first contact end of the slider being held in contact with the central pattern at a point aligned with a central axis of rotation of the driven roller, or the central pattern of the pattern base plate having a center aligned with a central axis of rotation of the driven roller.

Since the point of contact between the first contact end and the central pattern is aligned with the central axis of rotation of the driven roller, resistance to the rotation of the driven roller due to contact between the first contact end and the central pattern is minimized. The slider support is directly connected to the driven roller and hence requires no rotatable shaft. This can reduce the number of parts used, and the input device can be of a low cost and small in size. The fact that the center of the central pattern is aligned with the central axis of rotation of the driven roller and the slider support is directly coupled to the driven roller allows the slider and the driven roller to be centered easily relatively to each other. As a result, the driven roller, the slider, and the pattern base plate can properly be positioned with respect to each other. Accordingly, the condition of rotation of the ball can accurately be detected through the driven rollers for highly reliable operation.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 7 is a cross-sectional view taken along line A—A of FIG. 6;

FIG. 8 is a cross-sectional view taken along line B—B of FIG. 6;

FIG. 9 is a cross-sectional view taken along line C—C of FIG. 6;

DESCRIPTION OF THE PREFERRED EMBODIMENTS

Figure 1:
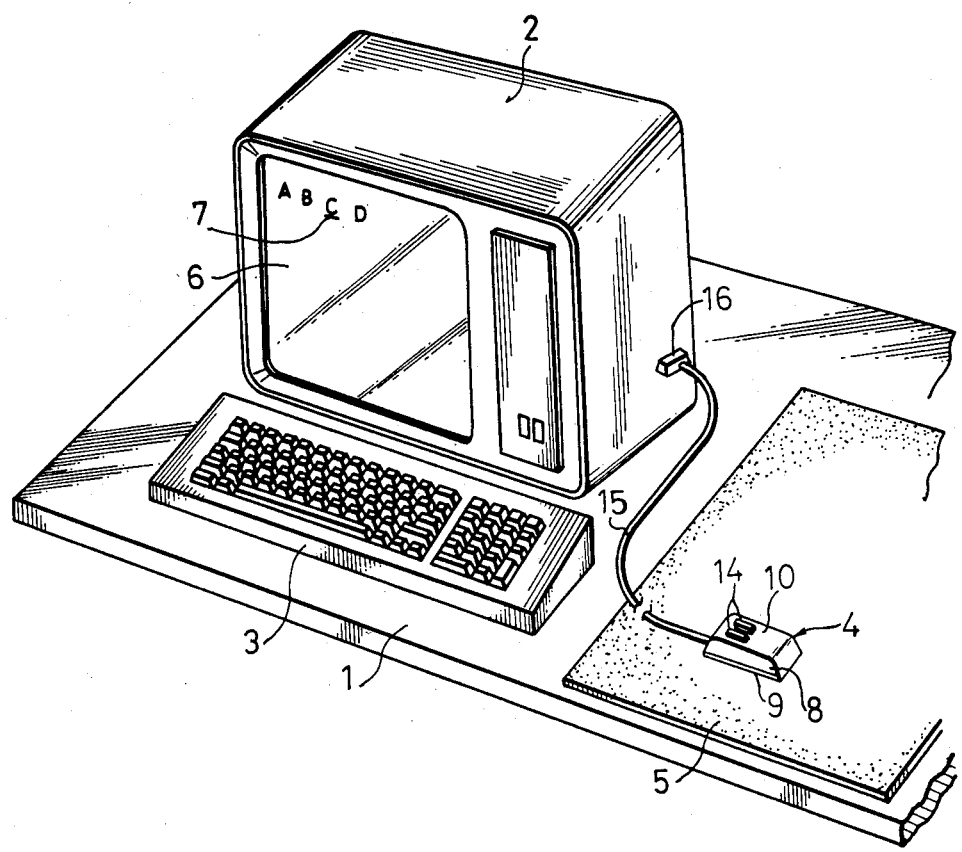
FIG. 1 is a perspective view of a graphic display apparatus including an X-Y input device according to the present invention.
Figure 2:
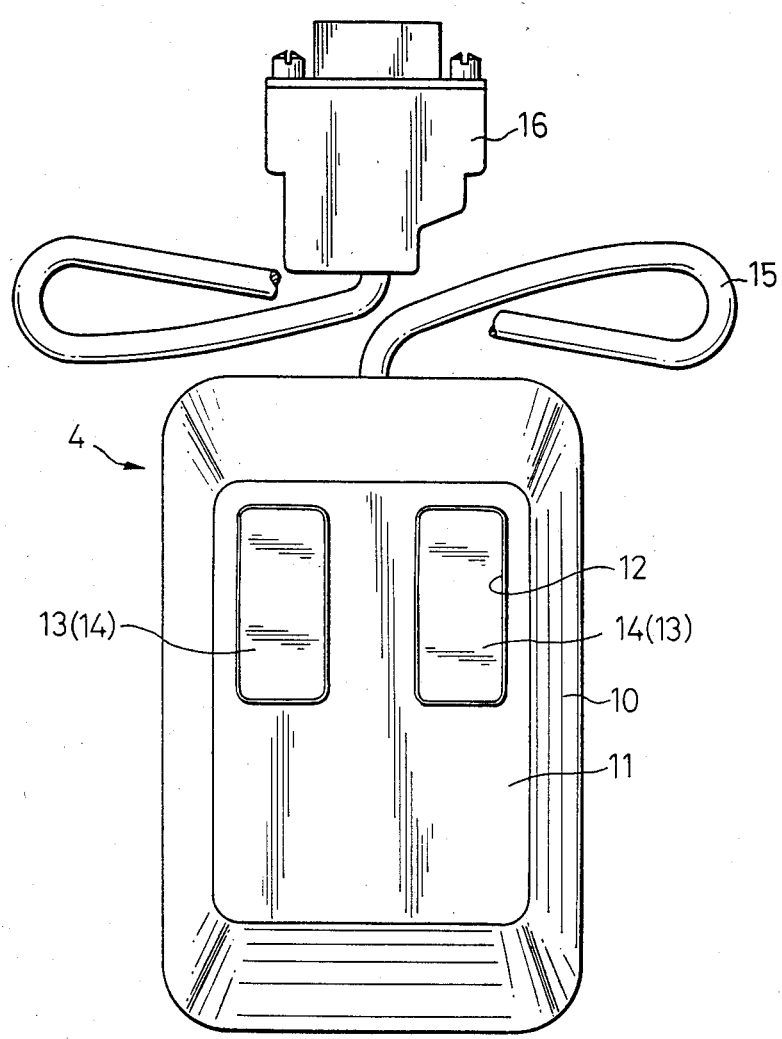
FIG. 2 is a plan view of the X-Y input device.

FIG. 1 shows in perspective a graphic display apparatus incorporating therein an X-Y input device according to the present invention.

The graphic display apparatus illustrated in FIG. 1 comprises a display unit 2 mounted on a table 1 and having a screen, a controller, and a data channel, an input device 3 having function keys, and an X-Y input device 4 according to the present invention. The X-Y input device 4 is operated by the operator on a sheet 5 placed on the table 1 to move a cursor 7 to any desired position on a screen 6 of the display unit 2.

The construction and principles of operation of the X-Y input device 4 will be described with reference to FIGS. 2 through 5.

The X-Y input device 4 has a casing 8 composed of a lower case 9 and an upper case 10, the lower and upper cases 9, 10 being molded of ABS resin, for example. The lower case 9 and the upper case 10 have stepped peripheral joints held in engagement with each other to prevent dust, water and other foreign matter from entering into the casing 8 through the joints.

The upper case 10 is of a size which can be held by one hand of the operator. The upper case 10, includes an upper wall 11, having slots 14 defined therethrough in the longitudinal direction of the upper case 10. The control ends of rectangular switch levers 13 are inserted in the slots 14 from within the upper case 10 and partly project from the upper wall 11.

As described later on, pushbutton switches are disposed respectively below the switch levers 13. The pushbutton switches serve not only as switches for the input device 4 itself, but to delete a portion of a displayed pattern immediately above or below the cursor 7, move such a displayed pattern portion to another location, or effect other various signal processing such as switching or control on the display unit 2. The display unit 2 and the input device 4 is connected to each other by a cable 15 and an attachment plug 16.

Figure 6:
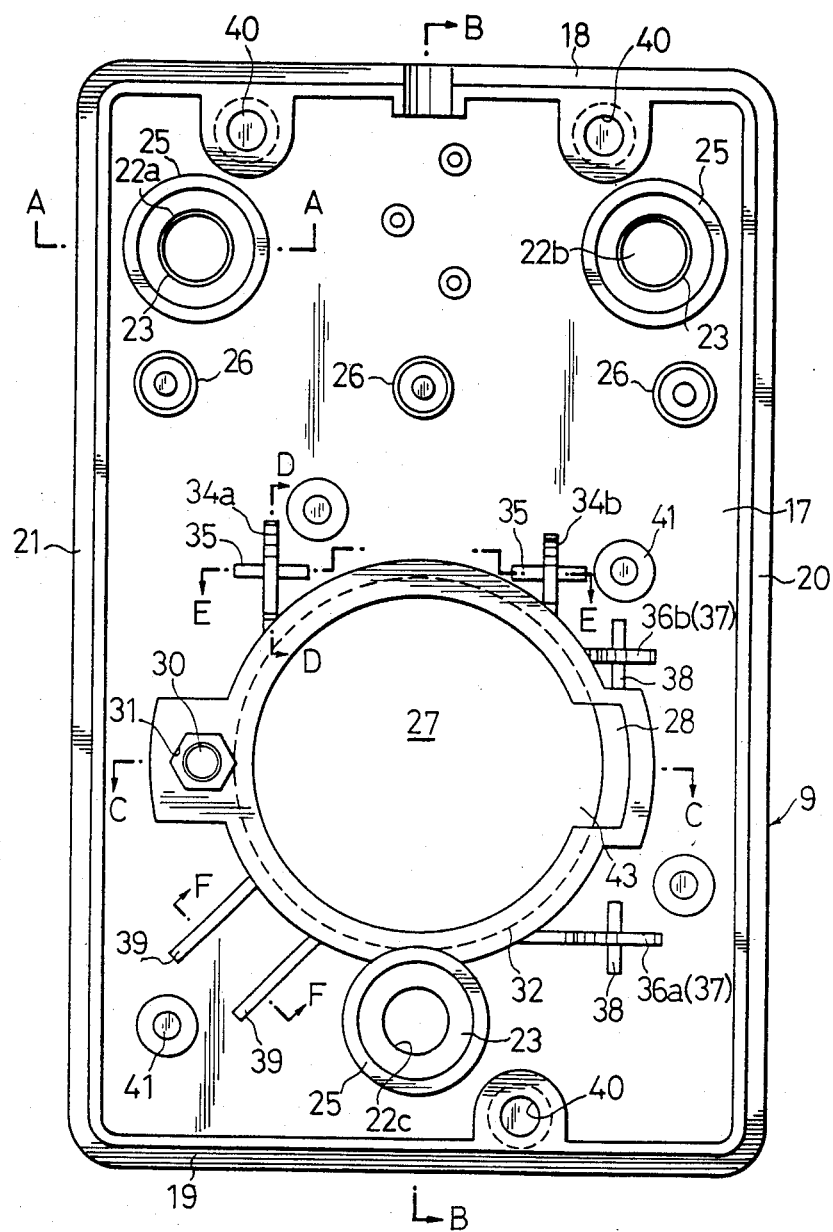
FIG. 6 is a plan view of a lower case of the input device.
Figure 10:
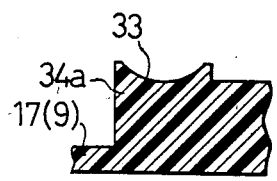
FIG. 10 is a cross-sectional view taken along line D—D of FIG. 6.

FIG. 6 is a plan view of the lower case 9. The lower case 9 has a bottom wall 17 around which there are a front wall 18, a rear wall 19, a righthand side wall 20, and a lefthand side wall 21 that are arranged contiguously and erected upwardly. The bottom wall 17 has small through holes 22a, 22b near corners between the front wall 18 and the righthand side wall 20 and between the front wall 18 and the lefthand side wall 21, and a small through hole 22c near a central portion of the rear wall 19. The small holes 22a–22c are positioned such that an isosceles triangle will be drawn by connecting the centers of the small holes 22a–22c.

FIG. 7 is a cross-sectional view taken along line A—A of FIG. 6. Each of the small holes 22a–22c has an annular tapered surface 23 flaring upwardly. A tubular body 25 is integrally formed around an upper open edge of the tapered surface 23, leaving an annular flat surface 24. A row of three studs 26 project from the bottom wall 17 and are spaced at intervals, the studs 26 being spaced rearwardly from the small holes 22a, 22b by a certain distance. The studs 26 serve to support and attach a printed-circuit board (described later on).

The bottom wall 17 has a substantially circular opening 27 having a diameter slightly larger than that of a ball (described later on) for allowing the ball to be placed in and out of the casing, the opening 27 being positioned immediately in front of the small hole 22c.

FIG. 8 is a cross-sectional view taken along line B—B of FIG. 6 and FIG. 9 is a cross-sectional view taken along line C—C of FIG. 6. As shown in FIGS. 6 and 9, the opening 27 has a peripheral edge including an upward step 28 of a prescribed width having an upward flat engaging portion and a downward step 29 having a downward flat engaging portion, the downward step 29 extending the full peripheral edge of the opening 27 except the upward step 28. A radially outward recess 43 is defined adjacent to the downward step 29 in diametrically opposite relation to the upward step 28. The downward step 29 has a hexagonal hole 31 positioned above the recess 43 for receiving a small nut, the hexagonal hole 31 communicating with the recess 43 through a screw insertion hole 30. The bottom wall 17 includes a peripheral wall 32 extending around the peripheral edge of the opening 27, the upward step 28, and the hexagonal hole 31.

Figure 11:
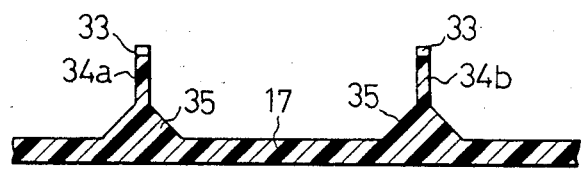
FIG. 11 is a cross-sectional view taken along line E—E of FIG. 6.

Arcuate projections 34a, 34b having upper arcuate bearing surfaces 33 are integrally formed with the peripheral wall 32 on its portion facing the front wall 18, the arcuate projections 34a, 34b being spaced from each other. FIG. 11 is a cross-sectional view taken along line E—E of FIG. 6. As shown in FIG. 11, stiffener ribs 35 are integrally formed with the respective arcuate projections 34a, 34b at their lower ends. The bearing surface 33 of the arcuate projection 34a has a curvature slightly smaller than that of the bearing surface 33 of the arcuate projection 34b. As illustrated in FIG. 6, arcuate projections 36a, 36b are also integrally formed with the peripheral wall 32 with the upward step 28 interposed therebetween, the arcuate projections 36a, 36b being spaced from each other. Like the arcuate projections 34a, 34b, the arcuate projections 36a, 36b have upper arcuate bearing surfaces 37 and integral stiffener ribs 38 at their lower ends. The bearing surface 37 of the arcuate projection 36a has a curvature slightly smaller than that of the bearing surface 37 of the arcuate projection 36b.

Figure 12:
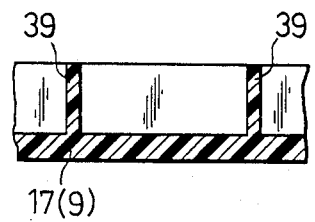
FIG. 12 is a cross-sectional view taken along line F—F of FIG. 6.
Figure 13:
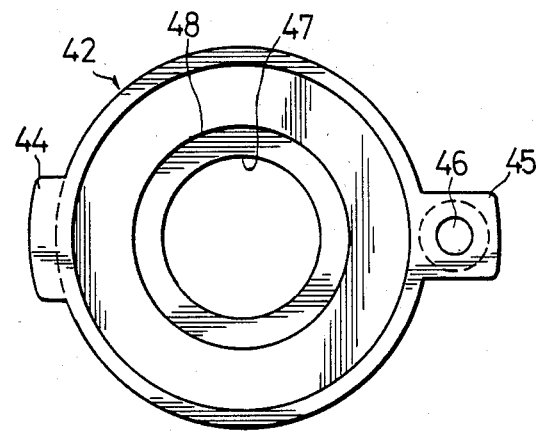
FIG. 13 is a plan view of a ring-shaped cover.
Figure 14:
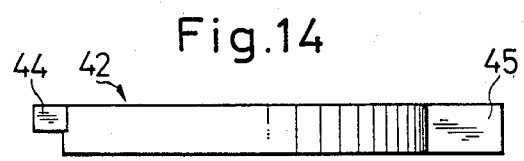
FIG. 14 is a front elevational view of the ring-shaped cover.
Figure 15:
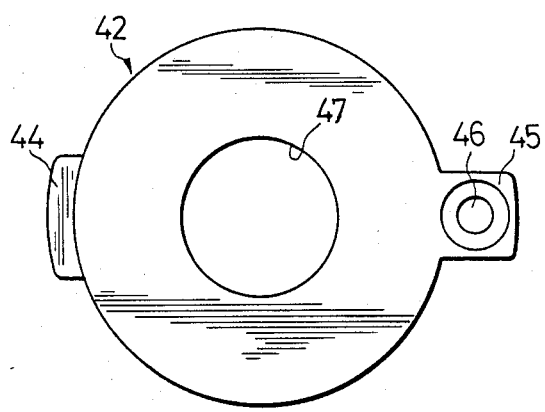
FIG. 15 is a bottom view of the ring-shaped cover.
Figure 16:
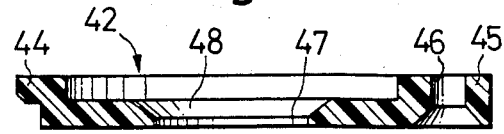
FIG. 16 is a cross-sectional view of the ring-shaped cover.

FIG. 12 is a cross-sectional view taken along line F—F of FIG. 6. As shown in FIGS. 12 and 6, two straight ridges 39, 39 extend parallel to each other at a spaced interval in a direction from the corner between the rear side wall 19 and the lefthand side wall 21 toward the peripheral wall 32, the ridges 39, 39 having ends integral with the peripheral wall 32. Two screw insertion holes 40, 40 are defined adjacent to the front wall 18, and one screw insertion hole 40 is defined adjacent to the rear wall 19, these screw insertion holes 40 serving to couple the lower and upper cases 9, 10 with screws. Two screw holes 41 shown in FIG. 6 serve to attach an annular holder (described later on) to an upper surface of the lower case 9.

FIGS. 13 through 16 illustrate a ring-shaped cover 42 to be attached to a lower surface of the lower case 9. The ring-shaped cover 42 has an outside diameter which is substantially the same as the inside diameter of the downward step 29 of the lower case 9. The ring-shaped cover 42 has a tongue 44 projecting from an outer peripheral portion thereof for being placed on the upward step 28, and an attachment 45 disposed in diametrically opposite relation to the tongue 44 for being fitted into the recess 43, the attachment 45 having a screw insertion hole 46. The ring-shaped cover 46 has a central circular opening 47 having a diameter which is considerably smaller than the diameter of the ball. The circular opening 47 has an annular tapered surface 48 flaring upwardly.

Figure 17:
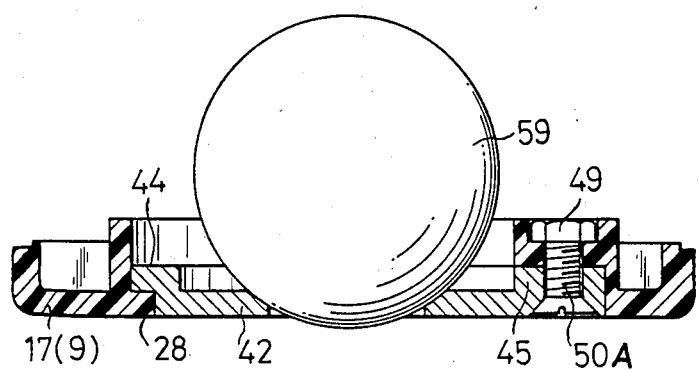
FIG. 17 is a cross-sectional view of the ring-shaped cover as attached in position.

For attaching the ring-shaped cover 42 to the lower case 9, the tongue 44 is inserted from the lower surface of the lower case 9 into the opening 27 until the tongue 44 is placed on the upward step 28. The ring-shaped cover 42 is bodily fitted below the downward step 29. A small nut 49 (FIG. 17) is placed into the hexagonal hole 31 in the lower case 9, and a screw 50 (FIG. 4) is threadedly inserted from the ring-shaped cover 42. The ring-shaped cover 42 is now fixed to the lower case 9 by engagement between the upward step 28 and the tongue 44 and the screw 50A. The opening 27 in the lower case 9 is covered by the ring-shaped cover 42, as shown in FIG. 17.

Figure 18:
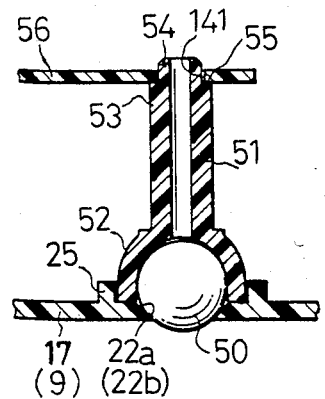
FIGS. 18 and 19 are fragmentary cross-sectional views of a support ball and a support leg as they are assembled.
Figure 19:
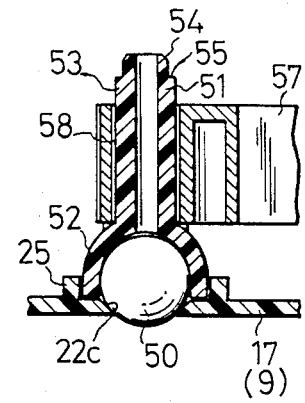

FIGS. 18 and 19 show in cross section a support ball 50 and a support leg 51. FIG. 18 illustrates the support ball 50 and the support leg 51 which are placed over each of the small holes 22a, 22b in the lower case 9, and FIG. 19 illustrates the support ball 50 and the support leg 51 which are placed over the small hole 22c in the lower case 9.

FIG. 18 will first be described. The support ball 50 which is made of steel and has a diameter greater than that of the small hole 22a (22b) is placed on the tapered surface 23 of the lower case 9. The support ball 50 has a portion projecting downwardly out of the small hole 22a (22b). The support leg 51 made of polyacetal is erected above the support ball 50. The support leg 51 has a cup-shaped portion 52 in which the support ball 50 is rotatably supported and which has an outside diameter equal to or slightly larger than the inside diameter of the tubular body 25 of the lower case 9. The support leg 51 also has a post 53 extending upwardly from the cup-shaped portion 52. and having an upper smaller-diameter end portion 54 to provide an engagement step 55 at a lower end of the smaller-diameter end portion 54. The smaller-diameter end portion 54 is inserted into an engagement aperture defined in a printed-circuit board 56. The printed-circuit board 56 is thus supported by the support leg 51. The support leg 51 as it engages the printed-circuit board 56 is prevented from being turned down after assembly.

For assembly, the support ball 50, the support leg 51, and the printed-circuit board 56 are successively placed on the lower case 9 in the order named. If the support leg 51 were turned down, installation of the printed-circuit board 56 would not be possible. To cope with this, the tubular body 25 is provided around each small hole 22 in the lower case 9 for contact with the cup-shaped portion 52 of each support leg 51 to thereby prevent the support leg 51 from falling down at the time of assembly. As shown, the support ball 50 is rotatably disposed in the cup-shaped portion 52. The support let 51 (cup-shaped portion 52) serves to prevent the support ball 50 from moving upwardly, with a portion of the support ball 50 projecting a given distance from the lower surface of the lower case 9 at all times.

The arrangement of FIG. 19 is different from the support structure with the support leg 51. More specifically, an annular holder 57 has a vertical through hole 58 in which the support leg 51 is inserted. Therefore, the support leg 51 is supported by the annular holder 57. The support ball 50 and the support leg 51 are of the same configuration as that shown in FIG. 18, and will not be described in further detail.

Figure 20:
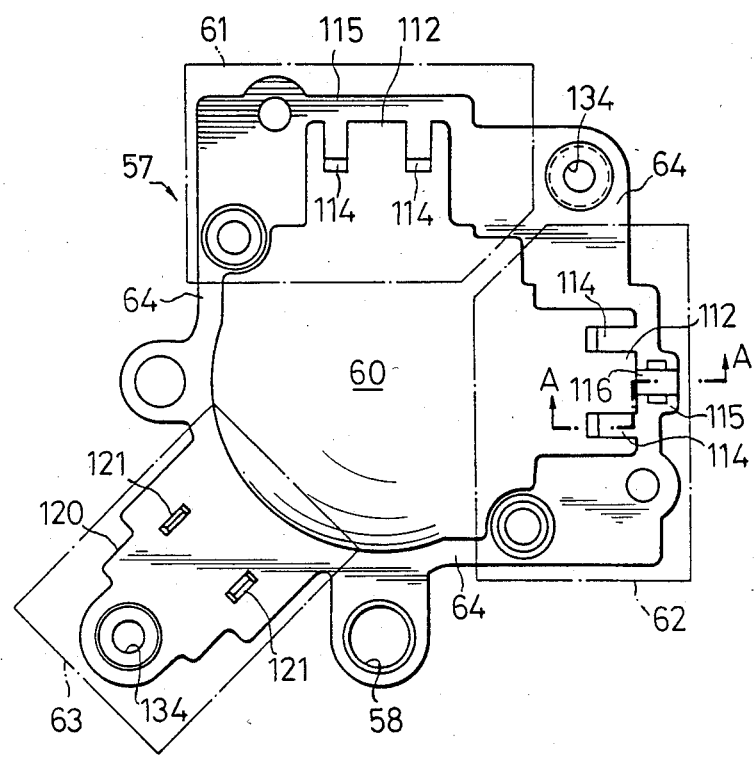
FIG. 20 is plan view of an annular holder.
Figure 21:
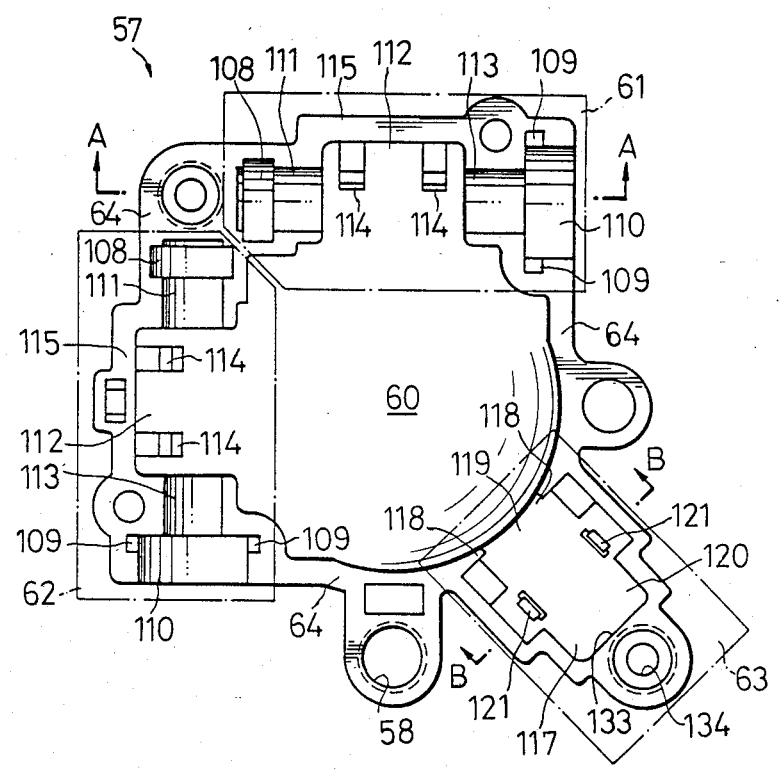
FIG. 21 is a bottom view of the annular holder.
Figure 22:
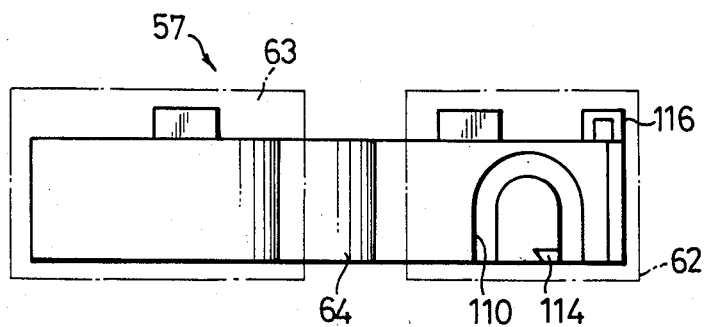
FIG. 22 is a front elevational view of the annular holder.

FIG. 20 is a plan view of the annular holder 57, FIG. 21 a bottom view of the annular holder 57, and FIG. 22 a front elevational view of the annular holder 57. The annular holder 57 is molded of polybutyleneterephthalate, for example, and has a through opening 60 of a size greater than the diameter of the ball, which is designated at 59. As shown in FIGS. 20 and 21, the annular holder 57 is composed of a first driven roller holder section 61 for holding and positioning one driven roller, a second driven roller holder section 62 for holding and positioning another driven roller, and a roller holder section 63 for holding and positioning a frictional force imposing roller. The first and second driven roller holder sections 61, 62 are arranged such that their longitudinal directions extend perpendicularly to each other. The roller holder section 63 is disposed in spaced and confronting relation to the first and second driven roller holder sections 61, 62. The first and second driven roller holder sections 61, 62 and the roller holder section 63 are integrally molded in an annular shape by connectors 64.

Prior to describing the configuration of the driven roller holder sections 61, 62, a driven roller encoder block 65 to be fitted and held thereby will first be described. FIGS. 26 through 29 are illustrative of such a driven roller encoder block 65, FIG. 26 being a plan view, FIG. 27 a front elevational view, FIG. 28 a righthand side elevational view, and FIG. 29 a fragmentary enlarged cross-sectional view.

The driven roller encoder block 65 is composed of a driven roller 66 and an encoder 67 which are integrally interconnected and will be handled as one block when assembled into the annular holder 57.

The drive roller 66 comprises a rotatable shaft 68, a roller section 69 integrally formed with the rotatable shaft 68 at a substantially central position, and bearings 70a, 70b mounted on opposite ends of the rotatable shaft 68.

The encoder 67 comprises an encoder case 71, a slider support 72 connected to one end of the rotatable shaft 68. for rotation with the driven roller 66, a slider 73 attached to the slider support 72, a pattern base plate 74 positioned by the encoder case 71 in confronting relation to the slider 73, and an attachment plate 75 securely attaching the pattern base plate 74 to the encoder case 71.

Figure 30:
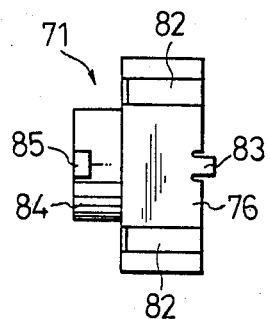
FIGS. 30, 31 and 32 are front elevational and side elevational views of an encoder case.
Figure 31:
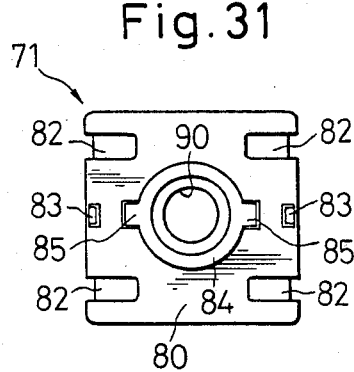
Figure 32:
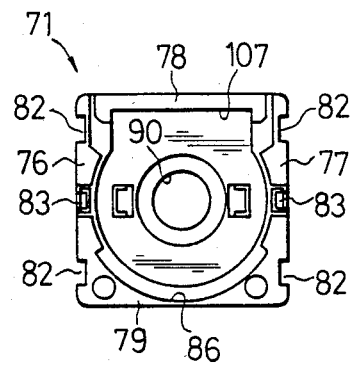

FIGS. 30 through 32 show the encoder case 71, FIG. 30 being a front elevational view, FIG. 31 a lefthand side elevational view, and FIG. 32 a righthand side elevational view. As illustrated in FIG. 32, the encoder case 71 comprises a rear wall 77, an upper wall 78, a lower wall 79, and a lefthand side wall 80, with a righthand side being open almost entirely.

Each of the front wall 76 and the rear wall 77 has two upper and lower engagement grooves 82 in which bent arms 81 (FIG. 27) of the attachment plate 75 are fitted. As shown in FIG. 31, the engagement grooves 82 extend partly into the lefthand side wall 80. Between the upper and lower engagement grooves 82, there are engagement fingers 83 extending toward the righthand side, with the engagement finger 83 on the front wall 76 being positioned in opposite relation to the engagement finger 83 on the rear wall 77.

The lefthand side wall 80 has a central integral cylindrical member 84 extending toward the driven roller 66, and horizontal directional projections 85 are provided in front and rear positions in the vicinity of the opening in the cylindrical member 84. As illustrated in FIG. 32, the righthand ends of the front wall 76, the rear wall 77, the upper wall 78, and lower wall 79 have a noncircular annular step 86 having the same shape as the outer profile of the pattern base plate 74. A housing recess 107 is formed one step below the annular step 86.

Figure 29:
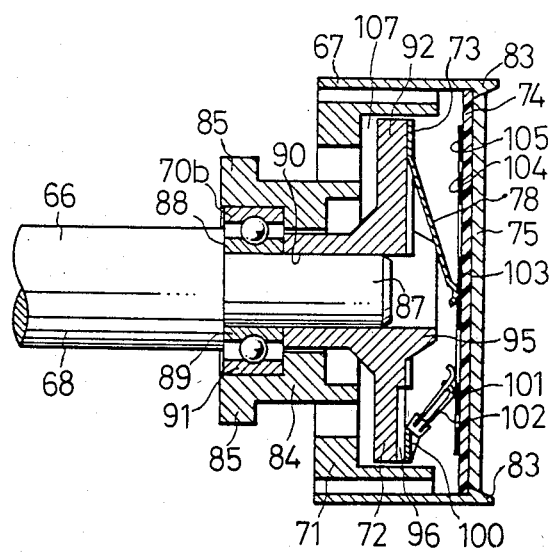
FIG. 29 is a fragmentary enlarged cross-sectional view of the driven roller encoder block.

As illustrate in FIG. 29, one end of the rotatable shaft 68 has a smaller-diameter portion 87 providing an engagement step 88 at an end thereof. The smaller-diameter portion 87 extends through an inner ring 89 of a bearing 70b which comprises a ball bearing, and is force-fitted in a central hole 90 in the slider support 72. The bearing 70b has an outer ring 91 is force-fitted in the cylindrical member 84 of the encoder case 71. When the smaller-diameter portion 87 of the rotational shaft 68 is force-fitted in the central hole 90 in the slider support 72, the engagement step 88 is held against an end of the inner ring 89, which is then clamped between the slider support 72 and the engagement step 88. The bearing 70b (inner ring 89) is now prevented by the encoder case 71 from being axially moved, so that the driven roller 66 will not be axially displaced.

Figure 33:
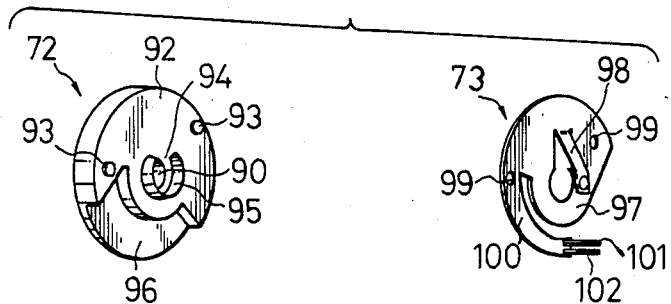
FIG. 33 is an exploded perspective view of a slider support and a slider.
Figure 34:
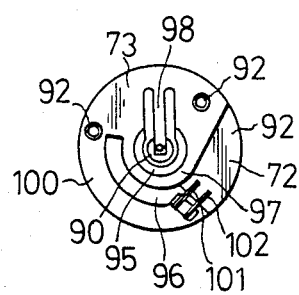
FIG. 34 is a side elevational view of a slider support and slider assembly.

FIG. 33 is an exploded perspective view of the slider support 72 and the slider 73, and FIG. 34 is a righthand side elevational view of the slider support and slider assembly. The slider support 72 is molded of polybutylene terephthalate, for example, and has a central hole 90. The slider support 72 has an attachment base 92 on a righthand side with two positioning pins 93 projecting therefrom and spaced at a certain distance. A C-shaped ridge 95 having a recess 94 is formed in the vicinity of the righthand open end of the central hole 90. The righthand side of the slider support 72 also has a substantially sectorial recess 96.

The slider 73 has a substantially annular central portion 97 fitted over the C-shaped rige 95 of the slider support 72 and includes a first contact end 98 formed by slitting the slider 73 and extending toward the center thereof. The slider 73 has attachment holes 99 at positions corresponding to the positioning pins 93 of the slider support 72, and an integral arm 100 extending along an area corresponding to the recess 96 in the slider support 72. The arm 100 has on a distal end thereof second inner and outer contact ends 102 formed as parallel ridges.

The slider 73 can be positioned with respect to the slider support 72 by inserting the positioning pins 93 of the slider support 72 into the attachment holes 99 in the slider 73 and also fitting the C-shaped ridge 94 into the annular central portion 97. The slider 73 can then be firmly fixed to the slider support 72 against wobbling movement by thermally fusing the heads of the positioning pins 93. With the slider 73 thus fixed to the slider support 72, the free end portion of the first contact end 98 of the slider 73 is positioned in confronting relation to the recess 94 and the central hole 90, and the arm 100 and the second inner and outer contact ends 101, 102 are positioned in confronting relation to the recess 96. Accordingly, the first contact end 98, the arm 100, and the second inner and outer contact ends 101, 102 will be elastically deformed freely without being disturbed.

Figure 35:
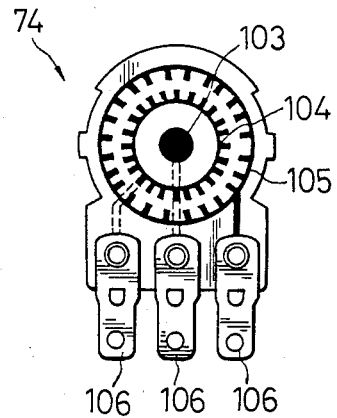
FIG. 35 is a plan view of a pattern base plate.

FIG. 35 is a plan view of the pattern base plate 74. The pattern base plate 74 has a central pattern portion 103, an inner peripheral pattern portion 104 formed concentrically with the central pattern portion 103, and an outer peripheral pattern portion 104 formed concentrically with the central pattern portion 103. The pattern portions 103, 104, 105 are connected to respective terminals 106.

For assembly, the slider support 72 with the slider 73 mounted on one side thereof is inserted into the housing recess 107 in the encoder case 71. The bearing 70b is fitted over the smaller-diameter portion 87 of the rotatable shaft 68 in advance, and the smaller-diameter portion 87 and the bearing 70b are forced into the encoder case 71 through the cylindrical member 84. The distal end of the smaller-diameter portion 87 is force-fitted into the central hole 90 in the slider support 72, and the bearing 70b is force-fitted into the cylindrical member 84. Now, the driven roller 66 is prevented from being axially pulled out, and the slider support 72 (slider 73) is rotatably held in the housing recess 107 in the encoder case 71 for rotation with the driven roller 66.

Then, the pattern base plate 74 is fitted in the annular step 86 in the encoder case 71 with the pattern portions 103, 104, 105 facing the slider 73. Since the annular step 86 is of the same noncircular shape as that of the outer profile of the pattern base plate 74, the pattern base plate 74 can be positioned with respect to the encoder case 71. The interval that the pattern base plate 74 is inserted into the encoder case 71, or the distance that the pattern base plate 74 can be pushed in toward the slider 73, is determined by the height of the annular step 86. When the pattern base plate 74 is being inserted into the encoder case 71, it is inserted while slightly pushing apart the two engagement fingers 83 which will then tentatively lock the pattern base plate 74 in the encoder case 71. With the pattern base plate 74 thus tentatively locked in the encoder case 71, the pattern base plate 74 will not be displaced or dislodged while the attachment plate 75 is being installed, and hence the assembling operation can be effected easily.

After the pattern base plate 74 has tentatively been locked in the encoder case 71, the C-shaped attachment plate 75 is held against the outer surface of the pattern base plate 74, and the four bent arms 81 of the attachement plate 75 are fitted respectively into the engagement grooves 82 in the front and rear walls 76, 77. Then, the distal ends of the bent arms 81 are bent into the engagement grooves 82 in the lefthand side wall 80 of the encoder case 71, as shown in FIG. 31. The pattern base plate 74 is now finally fastened firmly to the encoder case 71.

With the pattern base plate 74 thus fixed to the encoder case 71, the first contact end 98 of the slider 73 is resiliently held against the central pattern portion 103 on the pattern base plate 74, and the second inner and outer contact ends 101, 102 are resiliently held against the inner and outer peripheral pattern portions 104, 105, respectively. By inserting and fixing the pattern base plate 74 in the encoder case 71, the contact ends 98, 101, 102 are slightly deformed under pressure. However, the dimensions of the parts are designed such that when they are completely assembled together, the point where the first contact end 98 contacts the central pattern portion 103 and the center of the central pattern portion 103 will be aligned with the axis of the driven roller 66.

The driven roller encoder block thus constructed and assembled is inserted into each of the driven roller holder sections 61, 62.

The configuration of the driven roller holder sections 61, 62 will now be described.

Figure 23:
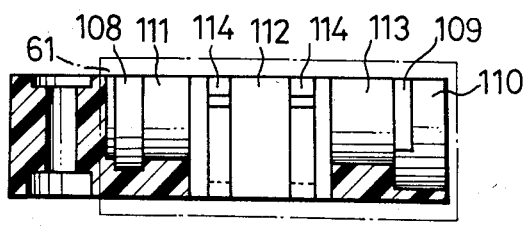
FIG. 23 is a cross-sectional view taken along line A—A of FIG. 21.
Figure 24:
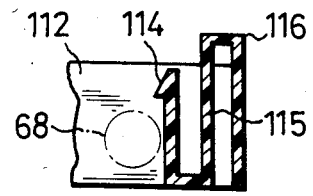
FIG. 24 is a cross-sectional view taken along line A—A of FIG. 20.

Each of the driven roller holder sections 61, 62 has a bearing fitting slot 108 (FIGS. 21 and 23) in which there will be fitted the bearing 70a that is not force-fitted in the encoder case 71. The driven roller holder section also has a projection fitting slot 109 in which there will be fitted the directional projections 85, 85 of the encoder case 71, and a cylindrical member fitting slot 110 in which there will be fitted the cylinderical member 84, the slots 109, 110 being spaced respective distances from the bearing fitting slot 108. The rotatable shaft 68 and the roller section 69 are inserted between the bearing fitting slot 108 and the projecting fitting slot 109. There are formed clearance recesses 111, 112, 113 to prevent the rotatable shaft 68 and the roller section 69 from contacting the driven roller holder section 61, 62. The roller section 69 is inserted and positioned in the central recess 112. Two removal prevention fingers 114, 114 project inwardly from a peripheral wall 115 and are spaced a distance which is slightly larger than the width of the roller section 69 (FIG. 24).

As shown in FIG. 21, the bearing fitting slot 108, the projection fitting slot 109, the cylindrical member fitting slot 110, and the recesses 111, 113 open downwardly.

For assembly, the two driven roller encoder blocks 65 are inserted respectively into the driven roller holder sections 61, 62 so that the bearing 70a, rotatable shaft 68 and roller section 69, directional projection 85, and the cylindrical member 84 of the driven roller encoder block 65 will be fitted respectively in the bearing fitting slot 108, recesses 111, 112, 113, projection fitting slot 109, and cylindrical member fitting slot 110 in the driven roller holder section 61 (62).

At this time, the rotatable shaft 68 is inserted while pushing the removal prevention fingers 114 slightly outwardly. When the rotatable shaft 68 is inserted in position, the distal end of the removal prevention finger 114 is slightly spaced from the rotatable shaft 68 so as not to interfere with rotation of the driven roller 66. With the removal prevention fingers 114 provided in the driven roller holder sections 61, 62, there will be no danger for the driven roller encoder blocks 65 to be accidentally dislodged from the driven rollder holder sections 61, 62 at later handling occasions. Therefore, the assembly can be handled with ease.

As illustrated in FIGS. 20, 22 and 24, the peripheral wall 115 has on its upper portion a lead wire seat 116 on which a lead wire extending from the encoder is seated.

The roller holder section 63 will be described with particular reference to FIGS. 21 and 25, FIG. 25 being a cross-sectional view taken along line B—B of FIG. 21.

The roller holder section 63 for holding the frictional force imposing roller comprises a case opening downwardly and having therein a housing space 117 in which a roller support (described later on) will slidably be accommodated. As shown in FIG. 21, stop walls 118 depends from a side of the housing space 117 which confronts the through opening 60, and a roller projecting opening 119 is defined between the stop walls 118.

Figure 25:
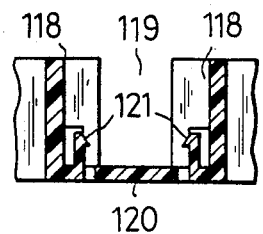
FIG. 25 is a cross-sectional view taken along line B—B of FIG. 21.
Figure 26:
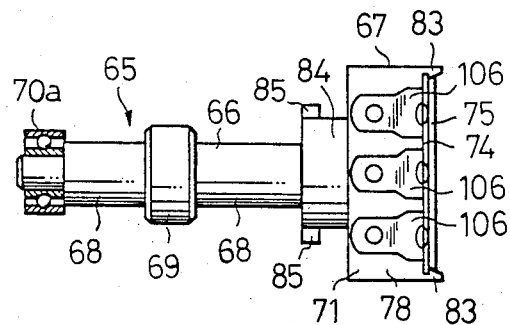
FIGS. 26, 27 and 28 are plan, front elevational and side elevational views of a driven roller encoder block.
Figure 27:
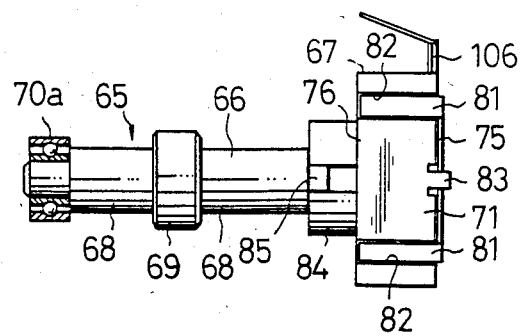
Figure 28:
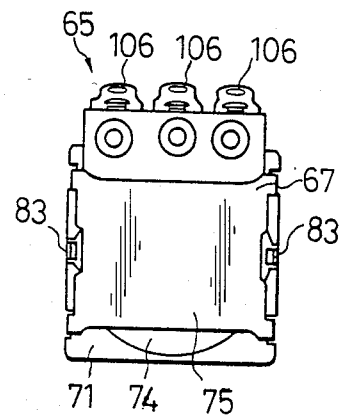

As shown in FIG. 25, two confronting removal prevention fingers 121 depend from an upper wall 120 (shown as being in a lower position) of the roller holder section 63 and are spaced a certain distance from each other.

Figure 36:
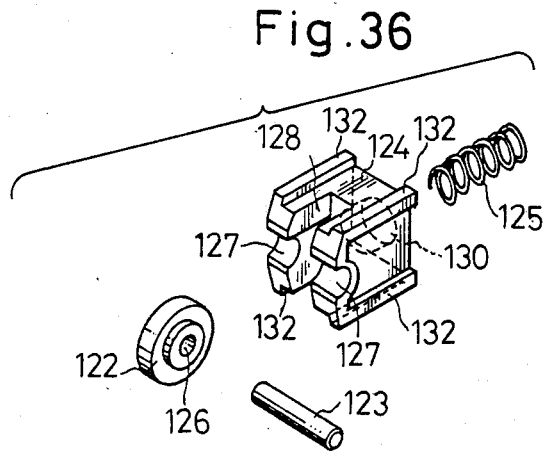
FIG. 36 is an exploded perspective view of a contact roller, a support shaft, a roller support, and a spring.
Figure 37:
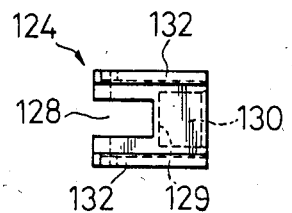
FIGS. 37, 38 and 39 are plan, side elevational and rear views of the roller support.
Figure 38:
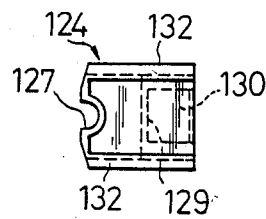

A contact roller 122, a support shaft 123, a roller support 124, and a spring 125 which will be held by the roller holder section 63 will be described with reference to FIGS. 36 through 39. FIG. 36 is an exploded perspective view of the contact roller 122, the support shaft 123, the roller support 124, and the spring 125, and FIGS. 37, 38 and 39 are plan, side elevational and rear elevational views of the roller support.

The contact roller 122 is molded of polyacetal mixed with polytetrafluoroethylene and has a very low coefficient of friction. The contact roller 122 has a shaft insertion hole 126 slightly larger in diameter, than the support shaft 123. Accordingly, the contact roller 122 can freely rotate on the support shaft 123.

The roller support 124 is molded of polyamide and has two semicircular bearings 127 defined in opposite ends of a front surface and opening forward for supporting the ends of the support shaft 123. The roller support 124 also has a roller housing recess 128 (FIG. 38) defined between the bearings 127 and extending rearward, with a partition 129 disposed behind the recess 128. The partition 129 has a circular spring seat recess 130 defined in a rear surface thereof and opening rearward.

Figure 39:
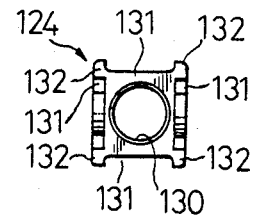

As shown in FIG. 39, the roller support 124 has clearance recesses 131 defined substantially entirely in an upper surface, a lower surface, and righthand and lefthand side surfaces, except for four corners, thus providing straight ridges 132 extending from front to rear ends along the corners.

The spring 125 comprises a coil spring having one end inserted in the spring seat recess 130 in the roller support 124 and an opposite end held against a rear wall 133 (FIGS. 21 and 40) of the roller holder section 63.

Figure 41:
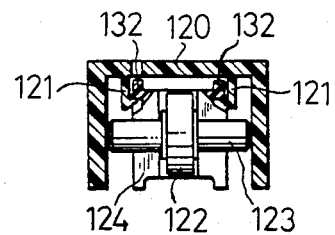
FIG. 41 is a front elevational view, partly in cross-section, of the roller support engaged in the roller holder.

The roller support 124 with the contact roller 122, the support shaft 123, and the spring 125 supported thereon is pushed into the housing space 117 in the roller holder section 63. Ridges 132 of the roller support 124 push slightly outwardly the heads of the two removal prevention fingers 121 while riding over the same, and then engage the removal prevention fingers 121 as shown in FIG. 41. Since the contact roller 122, the support shaft 123, and the roller support 124 are tentatively locked in the roller holder section 63 upon engagement between the ridges 132 and the removal prevention fingers 121, there will be no risk for these parts from dropping off when the annular holder 57 is to be installed on the lower case 9. Therefore, the assembling procedure can be simplified.

Figure 40:
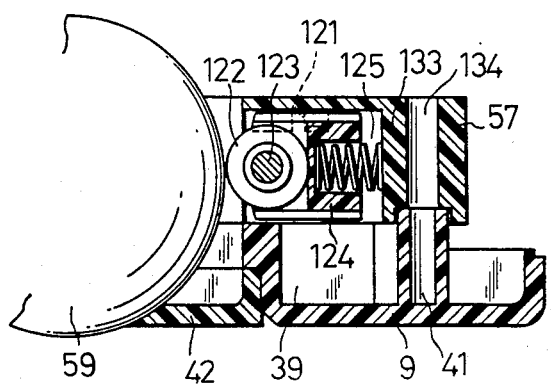
FIG. 40 is a fragmentary vertical cross-sectional view of the contact roller, the roller support, and the spring as arranged in a roller holder.

The removal prevention fingers 121 and the ridges 132 engaging therewith are dimensioned such that after their engagement, the roller support 124 can slide in the housing space 117. When the spring 125 is inserted in the housing space 117, it is held under compression between the spring seat recess 130 in the roller support 124 and the rear wall 133 of the roller holder section 63, and resiliently forces the roller support 124 to urge the contact roller 122 and the support shaft 123 into the roller projecting opening 119 (see FIG. 21). The contact roller has an outer peripheral portion projecting inwardly from the roller projecting opening 129 under the resiliency of the spring 125. The ends of the support shaft 123 are held against inner surfaces of the stop walls 118 under the resiliency of the spring 125. With the ends of the support shaft 123 held against the stop walls 118, the contact roller 122 and the support shaft 123 are prevented from being dislodged. When the ball 59 is inserted, as shown in FIG. 40, the contact roller 122 is slightly retracted against the resilient force of the spring 125, so that the support shaft 123 is slightly spaced from the stop walls 118. The resilient force from the spring 125 now acts on the ball 59 through the roller support 124, the support shaft 123, and the contact roller 122.

As described above, one of the two driven roller encoder blocks 65 is inserted and tentatively locked in the first driven roller holder section 61, the other driven roller encoder block 65 is inserted and tentatively locked in the second driven roller holder section 62, and the contact roller 122, the support shaft 123, the roller support 124, and the spring 125 are inserted and tentatively locked in the roller holder section 63. The annular holder 57 thus assembled is mounted on the lower case 9 with the openings in which the parts inserted being located downwardly.

Figure 45:
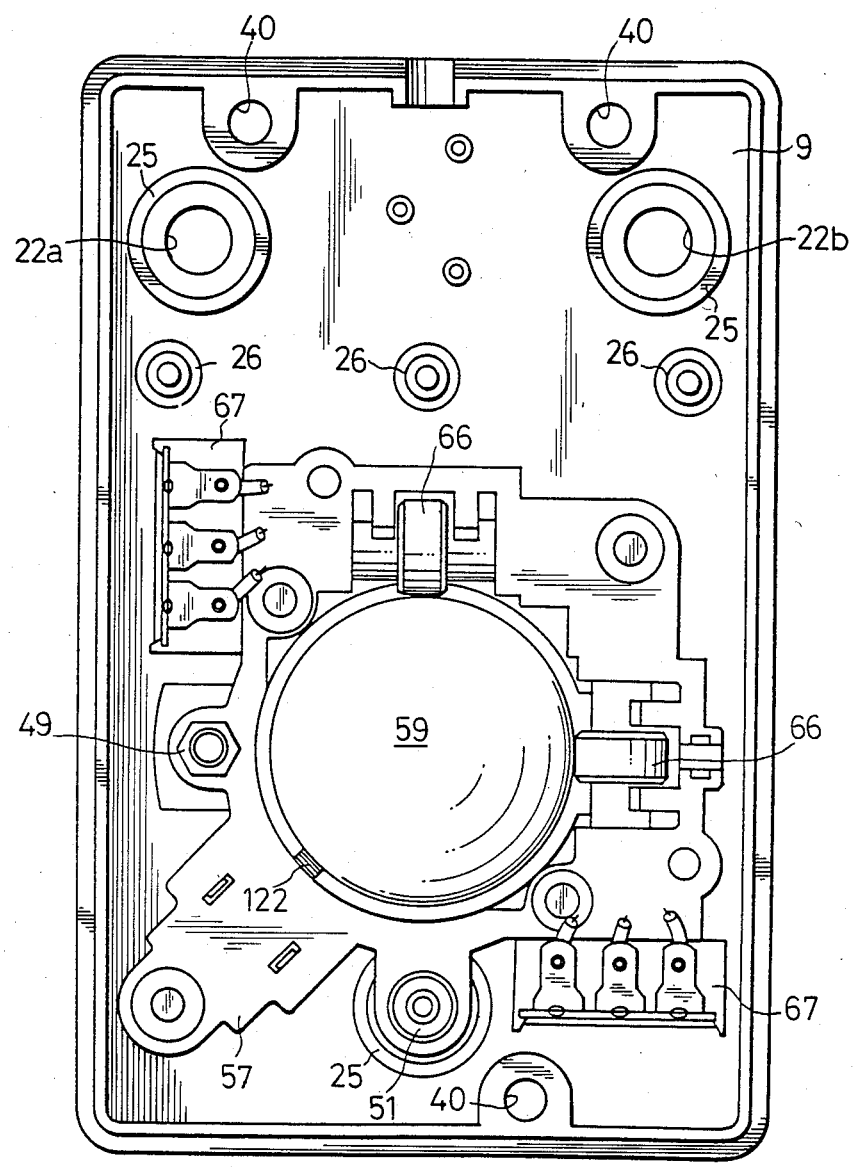
FIG. 45 is a plan view of the lower case with the annular holder attached and a printed-circuit board removed.

As shown in FIG. 19, the support ball 50 and the support leg 51 are disposed above the small hole 22 in the lower case 9, and the support leg 51 is inserted through the hole 58 (FIGS. 20 and 21) defined in the annular holder 57. The annular holder 57 is placed over the lower case 9 with two screw insertion holes 134 (FIGS. 20 and 21) defined in the annular holder 57 being aligned with the screw holes 41 (FIG. 6) in the lower case 9. Then, the annular holder 57 is screwed to the lower case 9 as shown in FIG. 45.

Figure 42:
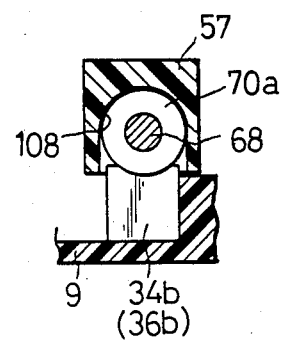
FIG. 42 is a fragmentary cross-sectional view of a construction for clamping a bearing.
Figure 43:
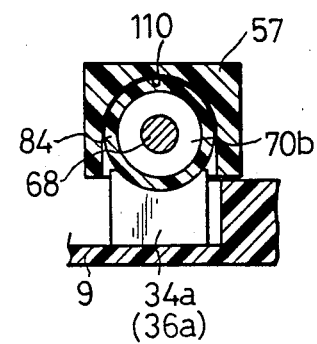
FIG. 43 is a fragmentary cross-sectional view of a construction for clamping a tubular member.
Figure 44:
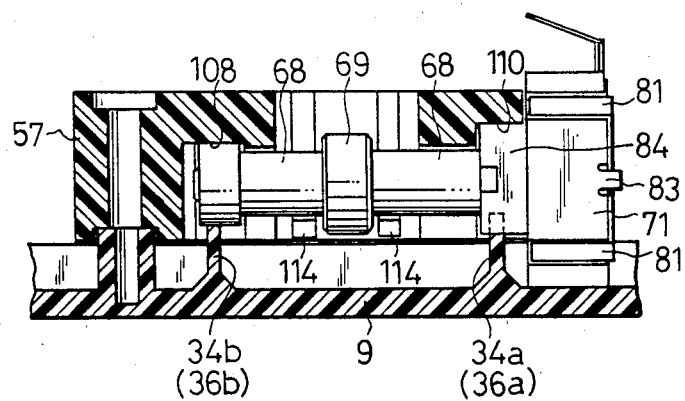
FIG. 44 is a fragmentary cross-sectional view of a construction for supporting bearings.

By thus installing the annular holder 57 on the lower case 9, the bearing 70a is sandwiched between the arcuate projection 34b (36b) projecting from the lower case 9 and the bearing fitting slot 108, as shown in FIGS. 42 and 44. As shown in FIGS. 43 and 44, the other bearing 70b is sandwiched between the arcuate projection 34a (36a) projecting from the lower case 9 and the cylindrical member fitting slot 110, with the cylindrical member 84 of the encoder case 71 being interposed. Since the bearing fitting slot 108 and the cylindrical member fitting slot 110 are integrally formed in the driven roller holder section 61 (62), and the arcuate projection 34a (36a) and the arcuate projection 34b (36b) are integrally formed with the lower case 9, the two driven rollers 66 are properly oriented.

Although not shown, by attaching the annular holder 57 to the lower case 9, the lower wall 79 of the encoder case 71 is held against the bottom wall 17 of the lower case 9 to prevent the encoder case 71 from being turned. The annular holder 57 as thus mounted on the lower case 9 is illustrated in FIG. 45.

Figure 47:
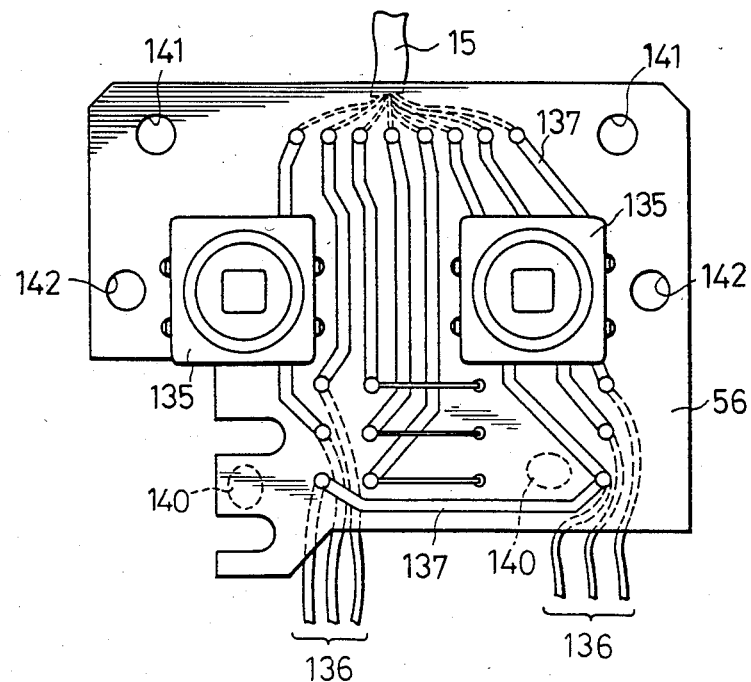
FIG. 47 is a plan view of the printed-circuit board with switches attached and a switch lever detached.
Figure 48:
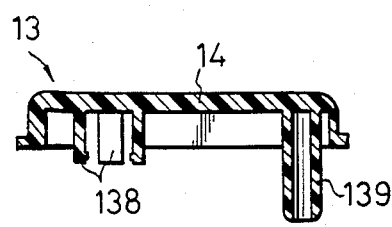
FIG. 48 is a vertical cross-sectional of a switch lever.
Figure 49:
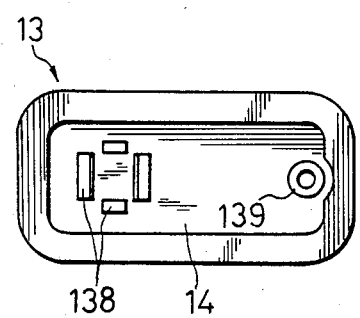
FIG. 49 is a bottom view of the switch lever.

FIG. 47 is a plan view of the printed-circuit board 56 with pushbutton switches 135 mounted thereon. The pushbutton switches 135 are installed on the printed-circuit board 56 at predetermined positions thereon. The printed-circuit board 56 has an electrically conductive pattern 137 connecting a plurality of lead wires 136 coupled to the encoders 67 to the cable 15 through the pushbutton switches 135. The switch lever 13 disposed over each of the pushbutton switches 135 is illustrated in FIGS. 48 and 49.

Figure 50:
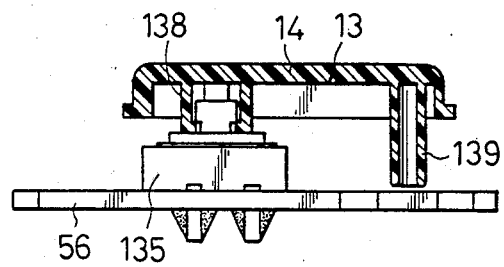
FIG. 50 is a cross-sectional view of the switch lever mounted on the printed-circuit board.

The switch lever 13 is composed, of a rectangular control end 14, a plurality of resilient members 138 projecting from a lower surface of the control end 14 near one end thereof for resiliently fitting over the head of the pushtubbon switch 135, and a support leg 139 projecting from the lower surface of the cotnrol end 14 near the other end thereof. As shown in FIG. 50, with the switch lever 13 fitted over the head of the pushbutton switch 135, the lower end of the leg 139 is positioned in confronting relation to a portion of the printed-circuit board 56. As illustrated in FIG. 47, there is no printed pattern 137 on bearing portions 140 facing the support legs 139.

Figure 51:
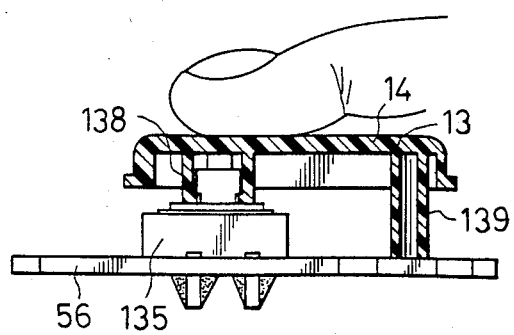
FIG. 51 is a cross-sectional view of the switch lever as it is operated upon.

As described above, the control end 14 of each of the switch levers 13 is exposed through one of the holes 12 in the upper case 10. When the control end 14 is depressed, the support leg 128 of the switch lever 13 is brought into contact with the printed-circuit board 56, as shown in FIG. 51. Then, the lower end of the support leg 139 serves as a fulcrum for allowing the switch lever 13 to turn toward the pushbutton switch 135 for actuating the latter.

As shown in FIG. 47, the printed-circuit board 56 has two engagement holes 141 in which the smaller-diameter portions 54 of the support legs 51 are fitted, and two engagement holes 142 in which the heads of the studs 26 on the lower case 9 are fitted.

Figure 46:
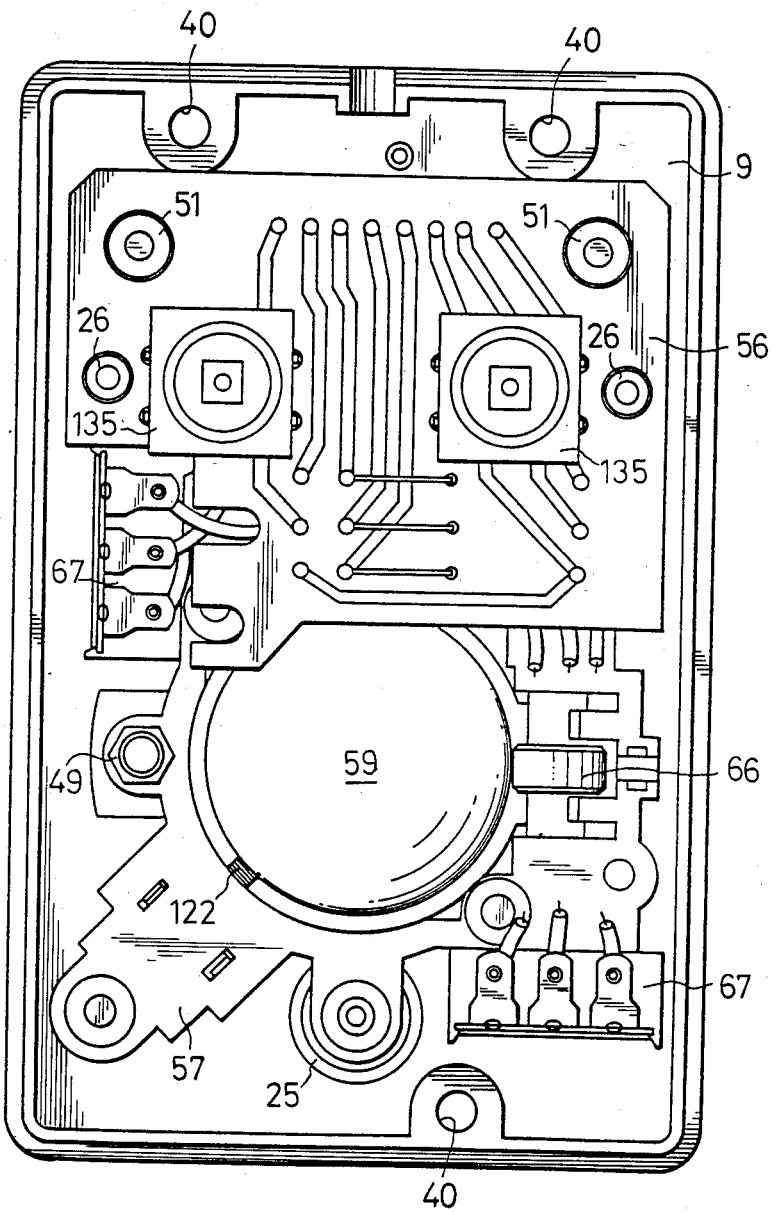
FIG. 46 is a plan view of the lower case with the annular holder and a printed-circuit board attached.

After the annular holder 57 has been mounted on the lower case 9 in the manner described above, the support balls 50 and the support legs 51 are placed over the front small holes 22a, 22b in the lower case 9. As shown in FIG. 18, the support legs 51 can be vertically fixed by the tubular bodies 25 without the danger of falling down. Therefore, the smaller-diameter portions 54 of the support legs 51 can easily be inserted into the engagement holes 141 in the printed-circuit board 56. At the same time that the smaller-diameter portions 54 are inserted in tne engagmeent holes 141, the heads of the studs 26 (FIG. 6) are inserted into engagement holes 142 defined in the printed-circuit board 56. Thereafer, the printed-circuit board 56 is screwed to the studs 26, as depicted in FIG. 46.

After the printed-circuit board 56 is thus fastened in position, the switch levers 13 are fitted over the pushbutton switches 135, and the upper case 10 is placed over and screwed to the lower case 9, thus completing the casing 8.

The ball 59 has not yet been installed in place. The ball 59 is then inserted into the casing 8 through the opening 27 defined in the lower case 9. Since the two driven rollers 66 disposed in mutually perpendicular relation (X - Y directions) are supported respectively by the roller holders 21, 22, only the contact roller 122 is retracted against the resiliency of the spring 125 upon insertion of the ball 59 into the casing 8. After the ball 59 has been inserted in position, the ball 59 is clamped between the two driven rollers 66 and the contact roller 122 under the resiliency of the springs 125. Then, the opening 27 is covered with the ring-shaped cover 42, which will be screwed to the lower case 9. The assembly of the input device is now completed.

Figure 52:
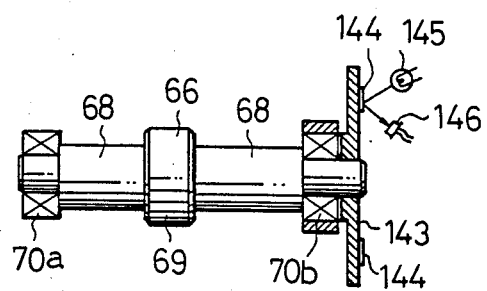
FIG. 52 is a side elevational view, partly in cross section, of a rotation detector means according to another embodiment.

While in the foregoing embodiment the encoders have been described as means for detecting the amount of rotation of the driven rollers, the present invention is not limited to such an arrangement. FIG. 52 shows a rotation detector means according to another embodiment. A rotatable disk 143 is concentrically attached to one end of the rotatable shaft 68 of the driven roller 66, and has a plurality of reflectors 144 are attached to an outer peripheral surface of the disk 143 and spaced at equal intervals in the peripheral direction. A pair of light-emitting element 145 and photodetector 146 is disposed in confronting relation to the reflectors 144. A beam of light emitted from the light-emitting element 145 is reflected by the reflectors 144. Intermittent light reflections are detected by the photodetector 146 and then counted for detecting the amount of rotation of the driven roller 66.

As an alternative, a number of light transmitting slits may be defined in a rotatable disk peripherally along an outer peripheral portion thereof, and a light-emitting element and a photodetector may be disposed one on each side of the rotatable disk.

Figure 53:
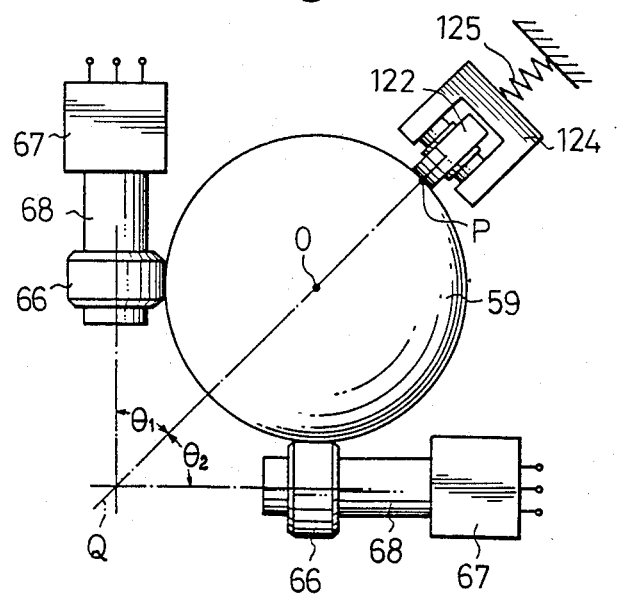
FIG. 53 is a plan view of a ball, driven rollers, and a contact roller which are arranged in position.
Figure 54:
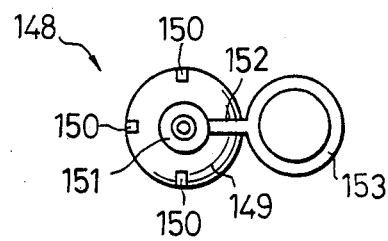
FIGS. 54, 55 and 56 are plan, vertical cross-sectional, and front elevational views of a movement limiting member.
Figure 55:
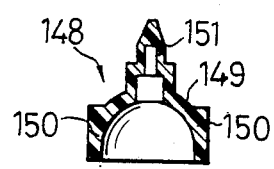
Figure 56:
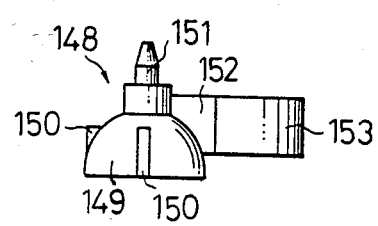

FIG. 53 shows the ball 59, the two driven rollers 66, and the contact roller 122 which are arranged in an assembled position. The two driven rollers 66 are held and positioned by the first and second driven roller holder sections 61, 62, so that the axes of the two driven rollers 66 extend perpendicularly with each other.

The contact roller 122 is held in contact with the ball 59 and positioned across the ball 59 in opposite relation to the two driven rollers 66. The contact roller 122 serves to transmit power reliably between the ball 59 and the driven rollers 66. The contact roller 122 is freely rotatable with rotation of the ball 59 and resiliently urges the ball 59 against the driven rollers 66.

The contact roller 122 is disposed with respect to the ball 59 and the driven rollers 66 such that a straight line Q passing through the point P of contact between the ball 59 and the contact roller 122 and the center O of rotation of the ball 59 intersects the axes of the drive rollers 66 at about 45 degrees ($\theta_1$, $\theta_2$) for equalizing the pressure of contact between the ball 59 and one of the driven rollers 66 to the pressure of contact between the ball 59 and the other driven roller 66. Therefore, the angles $\theta_1$, $\theta_2$ are designed to be equal to each other.

The two driven rollers 66 are individually rotated by the rotation of the ball 59, and directions and angles of rotation of the driven rollers 66 are detected by the rotation detector means such as the encoders 67 associated respectively with the driven rollers 66. The state of rotation of the ball 59 can therefore be detected as components in the X- and Y-axis directions.

Figure 3:
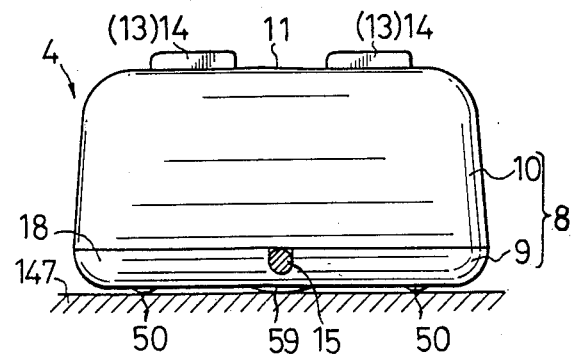
FIG. 3 is a front elevational view of the input device.
Figure 4:
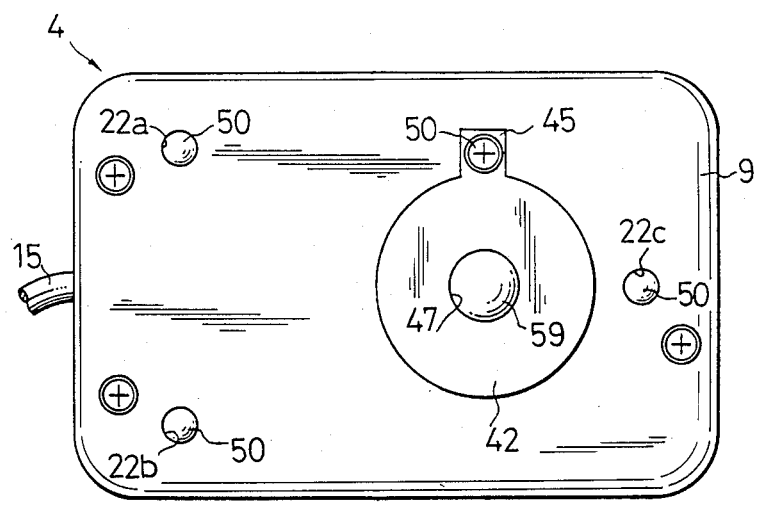
FIG. 4 is a bottom view of the input device.
Figure 5:
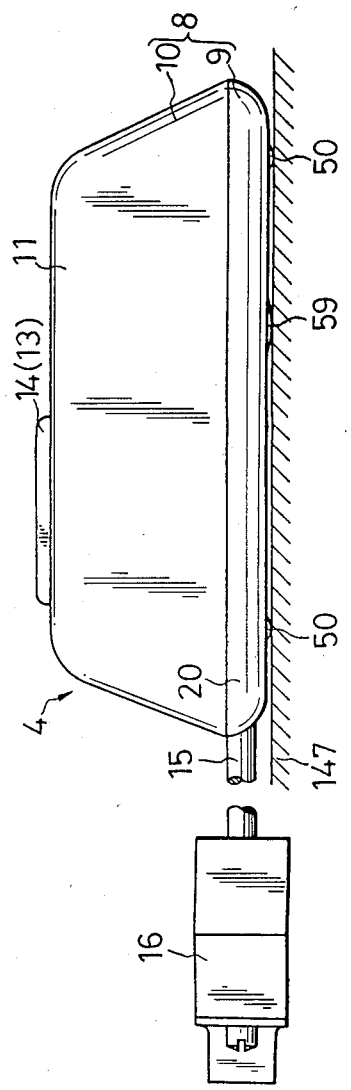
FIG. 5 is a side elevational view of the input device.

The input device 4 is placed on a given base 147 in the manner shown in FIGS. 3 through 5. The three support balls 50 have portions projecting downwardly through the small holes 22a, 22b, 22c for bearing the combined weight of the casing 8, the printed-circuit board 56, the annular holder 57, the two driven roller encoder blocks 65, and the contact roller 122 through the support legs 51. A portion of the ball 59 also projects downwardly-through the opening 47 in the ring-shaped cover 42. The ball 59 is pressed against the base 147 chiefly under its own weight.

If there is water, ink, oil, or dust on the base 147, then such foreign matter tends to get stuck to the surface of the ball 59 while the input device 4 is in use on the base 147. Such accumulation of unwanted foreign matter on the ball 59 would cause the driven rollers 66 to slip on the ball 59, with the result that no accurate transmission of rotative power would be effected between the ball 59 and the driven rollers 66, and the reliability of the input device 4 would be lowered. According to the present invention, the ring-shaped cover 42 is detachably attached to the lower case 9 to allow the ball 59 to be taken out of the casing 8 periodically or as desired for cleaning.

Since the printed-circuit board 56 with the pushbutton switches 135 is not disposed directly above the ball 59, but displaced laterally off the ball 59, the entire height of the input device 4 is lowered, and hence the input device 4 can be small in size and of a low profile.

Figure 57:
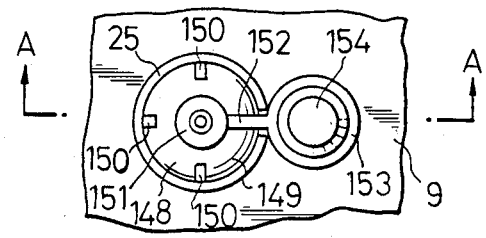
FIG. 57 is a fragmentary plan view of the movement limiting member as placed on the lower case.
Figure 58:
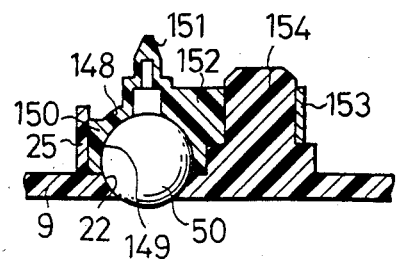
FIG. 58 is a cross-sectional view taken along line A—A of FIG. 57.

FIGS. 54 through 58 illustrate a movement prevention member 145 according to another embodiment for preventing the support ball 50 from moving upwardly. The movement prevention member 145 has a lower cup-shaped portion 149 in which the support ball 50 is rotatably accommodated. Three abutment ribs 150 project radially outwardly from an outer peripheral surface of the cup-shaped portion 149 and are peripherally spaced at intervals. As shown in FIG. 58, the rib 150 has a vertical end surface held against an inner surface of the tubular body 25 projecting from the lower case 9.

The movement prevention member 145 includes an insertion end 151 above the cup-shaped portion 149. The insertion end 151 will be inserted into a slot or a recess defined in the annular holder 57 to prevent the movement prevention member 148 from being raised.

An arm 152 extends horizontally in a radially outward direction from an outer peripheral portion of the cup-shaped portion 149 which is devoid of the abutment rib 150. An annular member 153 is integrally formed with a distal end of the arm 152.

FIGS. 57 and 38 show the movement prevention member 128 placed on the lower case 9. As illustrated in FIG. 58, the support ball 50 of steel is placed over the small hole 22 in the lower case 9, and the movement prevention member 148 is disposed over the support ball 50. A stepped support pin 154 projects upwardly from the lower case 9 in the vicinity of the small hole 22 and has a head inserted in a hole in the annular member 153. The movement prevention member 148 is positioned and prevented from being displaced and turned down through engagement between the annular member 153 and the support pin 154 and abutment of the abutment ribs 150 against the tubular body 25.

Although certain preferred embodiments have been shown and described, it should be understood that many changes and modifications may be made therein without departing from the scope of the appended claims.

What is claimed is:

1. An X-Y input device comprising a rotatable ball, a first driven roller held in contact with said rotatable ball and rotatable in response to rotation of said rotatable ball, a second driven roller held in contact with said rotatable ball and rotatable in response to rotation of said rotatable ball, said second driven roller having an axis of rotation extending substantially perpendicularly to that of said first driven roller, first rotation detector means for detecting an amount of rotation of said first driven roller, and second rotation detector means for detecting an amount of rotation of said second driven roller, each of said rotation detector means comprising a pattern base plate including a central pattern and a peripheral pattern concentric with said central pattern, a slider having a first contact end held in slidable contact with said central pattern and a second contact end held in slidable contact with said peripheral pattern, and a slider support supporting said slider and connected to each of said driven rollers for rotation therewith, said first contact end of said slider being held in contact with said central pattern at a point aligned with a central axis of rotation of said driven roller.

2. An X-Y input device according to claim 1, wherein said first contact end is formed from a central portion of said slider so that it projects from a center thereof, said first contact end being resiliently pressed against said central pattern.

3. An X-Y input device comprising a rotatable ball, a first driven roller held in contact with said rotatable ball and rotatable in response to rotation of said rotatable ball, a second driven roller held in contact with said rotatable ball and rotatable in response to rotation of said rotatable ball, said second driven roller having an axis of rotation extending substantially perpendicularly to that of said first driven roller, first rotation detector means for detecting an amount of rotation of said first driven roller, and second rotation detector means for detecting an amount of rotation of said second driven roller, each of said rotation detector means comprising a pattern base plate including a central pattern and a peripheral pattern concentric with said central pattern, a slider having a first contact end held in slidable contact with said central pattern and a second contact end held in slidable contact with said peripheral pattern, and a slider support supporting said slider and connected to each of said driven rollers, for rotation therewith, said central pattern of said pattern base plate having a center aligned with a central axis of rotation of said driven roller.

4. An X-Y input device according to claim 2, wherein said first contact end is formed from a central portion of said slider so that it projects from a center thereof, said first contact end being resiliently pressed against said central pattern.

* * * * *